United States Patent [19]

Johnson et al.

[11] Patent Number: 5,279,155
[45] Date of Patent: Jan. 18, 1994

[54] MASS AIRFLOW SENSOR

[75] Inventors: Stewart D. Johnson, Jo Daviess County; Martin Oakes; Michael J. Taylor, both of Stephenson County, all of Ill.

[73] Assignee: Honeywell, Inc., Minneapolis, Minn.

[21] Appl. No.: 13,286

[22] Filed: Feb. 4, 1993

[51] Int. Cl.$^5$ .............................. G01F 5/00; G01F 1/68
[52] U.S. Cl. .................................. 73/202.5; 73/204.21
[58] Field of Search ................ 73/204.21, 204.22, 202, 73/202.5

[56] References Cited
U.S. PATENT DOCUMENTS

| | | |
|---|---|---|
| 3,559,482 | 2/1971 | Baker et al. ............... 73/202.5 |
| 4,431,132 | 2/1984 | Edmundson . |
| 4,749,122 | 6/1988 | Shriver . |
| 4,776,214 | 10/1988 | Moran et al. . |
| 4,856,328 | 8/1989 | Johnson . |
| 4,864,724 | 9/1989 | Bergstrom . |
| 4,885,938 | 12/1989 | Higashi . |

OTHER PUBLICATIONS

Paper by P. W. Ross "A Novel Design of Viscous Flowmeter" Sep. 1981.
Paper by K. A. Blake "The design of piezometer rings" 1976.

*Primary Examiner*—Richard E. Chilcot, Jr.
*Assistant Examiner*—Harshad Patel
*Attorney, Agent, or Firm*—William D. Lanyi

[57] ABSTRACT

A mass airflow sensor is provided with a system of conduits and ports which connect the mass airflow sensor to a main fluid flow channel. Pairs of ports connect the plurality of fluid interconnection conduits with the main fluid flow conduit being monitored. The mass airflow sensing apparatus is adapted to receive a mass airflow sensor in fluid communication with its system of conduits. First and second pairs of ports are disposed upstream from a third and fourth pair of ports. The first and second pairs of ports are connected to each other in a way which provides an average flow from each of the pairs to an inlet of the mass airflow sensor. In a particularly preferred embodiment of the present invention, the outlet of the mass airflow sensor is connected to an arrangement of conduits and ports that is a mirror image of the upstream arrangement of conduits and ports.

13 Claims, 3 Drawing Sheets

MASS AIRFLOW SENSOR

BACKGROUND OF THE INVENTION

1. Field of the Invention

The present invention relates generally to mass airflow sensors and, more particularly, to a mass airflow sensing system arranged in association with a conduit in which a plurality of ports are disposed around the inner circumference of the conduit and connected in fluid communication with the mass airflow sensor.

2. Description of the Prior Art

Airflow sensors are used in many different types of applications, such as heating and ventilating systems, medical applications and automotive systems. For example, U.S. Pat. No. 4,885,938, which issued to Higashi on Dec. 12, 1989, discloses a flow meter fluid composition correction system. It utilizes certain relationships among the mass flow signal, the thermal conductivity, the specific heat and the density of a fluid being measured to correct a mass flow meter measurement with respect to changes in composition of the fluid that is being measured.

U.S. Pat. No. 4,864,724, which issued to Bergstrom on Sep. 12, 1989, describes a planar mounting of silicon micromachined sensors for the purpose of measuring pressure and fluid flow. This patent describes a process for flush mounting a silicon micromachined sensor for fluid flow measurements with an adjacent face of a substrate. The faces of the substrate and the sensor, over which the fluid flow passes, are disposed on a conformal surface. An adhesive is applied between the sensor and the substrate to secure the sensor and substrate to each other. Upon removal from the conformal surface, the faces are cleaned of adhesive and the electrical signal generating means of the sensor are connected with signal processing means, such as by wire bonding. The sensor lies flush with the face of the substrate, avoiding interference with the fluid flow over the sensor face and, therefore, maintaining sensitivity throughout the life of the sensor.

U.S. Pat. No. 4,856,328, which issued to Johnson on Aug. 15, 1989, describes a sampling probe flow sensor which comprises a tubular probe body that is located within and aligned with a venturi passageway. The probe body is provided with a channel therethrough connecting openings located at high and low pressure regions in the venturi passageway. The openings are configured to cause a least a 90 degree change in direction of air flowing therethrough from the venturi passageway to protect a fragile flow sensor in the channel from damage by suspended contaminants.

U.S. Pat. No. 4,776,214 which issued to Moran et al on Oct. 12, 1988, describes a mass airflow sensor which comprises a sensing element for the mass airflow sensor disposed on a first portion of a thin flexible film substrate while an extension of the substrate provides integral electrical conductive metallizations that connect the sensing element to associated sensor electronic components mounted on a second portion of the film substrate. This device eliminates the need for individual soldered wire connections to connect the sensing element to its associated electronics.

U.S. Pat. No. 4,749,122, which issued to Shriver on Jun. 7, 1988, discloses a combustion control system in which the economic optimum efficiency is achieved by periodically computing a relative index of combustion efficiency using the combustion chamber as a real-time, on line calorimeter. This is accomplished by first determining the combustion chamber inputs and outputs required to calculate a relative index of performance, sequentially comparing the latest relative index value with the previous value and then adjusting the air-to-fuel ratio to achieve an improved index value.

U.S. Pat. No. 4,431,132, which issued to Edmundson on Feb. 14, 1984, describes a control valve system for gas water heaters in which a valve is provided with a snap action characteristic and is constructed to inhibit the supply to the burner of insufficient amounts of gas to ensure reliable ignition. For example, a flexible diaphragm can be provided with opposite sides that are connected to respective passages to receive pressures upstream and downstream of a restriction in a water flow path. The diaphragm can open a gas valve in response to a predetermined flow of fluid along the path. In order to provide the snap action characteristic, a further passage is provided that links the two passages coupled to the diaphragm and contains a ball that can block the further passage only when the fluid flow is sufficient to open the gas valves sufficiently for an ignitable quantity of gas to flow to the burner.

A paper by P. W. Foss, entitled "A Novel Design of Viscous Flowmeter", was delivered at the International Conference on Advances in Flow Measurement Techniques in September, 1981. This paper describes the development of a viscous flow meter which uses two commercially available flame traps connected in series and separated by a small airspace. The flow meter is inserted in a standard pipe. Experimental results are presented in this paper which show that the flow meter behaves as a conventional laminar flow meter. The flow meter was designed for use with a variable compression engine and was evaluated during the production testing of several engines.

A paper, by K. A. Blake, entitled "The design of piezometer rings", was printed in the Journal of Fluid Mechanics, Volumn 78, part 2, pages 415-428 which Was printed in Great Britian in 1976. This article describes the theoretical work performed at the National Engineering Laboratory in Glasgow, Scotland. A mathematical model is discussed in which a reading from a piezometer ring is predicted from the individual wall static measurements and, from the mathematical model, the conventional form of a piezometer ring is shown as being unreliable in asymmetrical flow. The paper also describes an alternative form of ring known as the Triple-T which is analyzed and shown to provide a true average pressure in all cases. The paper recommends that the Triple-T form be used in future tests. Throughout the paper, a description of piezometric devices is provided in terms of its use to measure pressure at various places along a flow channel.

SUMMARY OF THE INVENTION

The present invention provides a system for connecting a mass airflow meter to a conduit in a manner which samples the flow of fluid through the conduit in a way which efficiently obtains an average flow measurement and which is insensitive to flow inconsistencies at different portions of the conduit. For example, it is well known that bends in a conduit create flow patterns, such as counterrotating vortices, that create different flow patterns at different portions of the inner surface of the conduit. These types of flow perturbations create flow variations which cause inconsistent measurements of the flow through the conduit.

In a preferred embodiment of the present invention, a flow sensor comprises a housing having a flow channel extending through it, wherein the flow channel has an upstream portion and a downstream portion. First and second pairs of ports are connected in fluid communication with the flow channel and arranged along a first circumference of the flow channel. A first means is provided, external to the flow channel, for connecting the first pair of ports together in fluid communication with each other. In addition, a second means is provided external to the flow channel for connecting the second pair of ports together in fluid communication with each other. These first and second connecting means are, in turn, connected together in fluid communication with each other by a third connecting means. Third and fourth pairs of ports connected in fluid communication with the flow channel and arranged along a second circumference of the flow channel are provided, wherein the second circumference is displaced from the first circumference in a direction toward the downstream portion of the flow channel. A fourth means, which is external to the flow channel, is provided for connecting the third pair of ports together in fluid communication with each other and a fifth means, external to the flow channel, is provided for connecting the fourth pair of ports together in fluid communication with each other. The fourth and fifth connecting means are connected in fluid communication with each other by a sixth connecting means and the third and sixth connecting means are connected in fluid communication with each other by a seventh connecting means. A fluid measuring device, such as a microbridge mass airflow sensor, is disposed within the seventh fluid connecting means that is used to connect the third and sixth connecting means together.

As described above, the first and second pairs of ports connected in fluid communication with the flow channel are selectively connected together by a system of conduits in such a way that the first pair of ports and the second pair of ports each sample fluid from different areas along the first circumference of the channel and those ports are connected to conduits that are, in turn, connected to each other to obtain an average flow from the first and second ports. The flow from the first pair of ports is connected to a conduit which is also connected to the flow from the second pair of ports. These two flows are averaged together and connected to an input of a mass airflow sensor. In a preferred embodiment of the present invention, the outlet of the mass airflow sensor is connected to a system of conduits and ports that are generally arranged as a mirror image of the ports and conduits of the inlet portion of the system. However, it should be understood that in systems which are not expected to carry flow in both directions, the outlet of the mass airflow sensor need not be connected to the same type of conduits and outlet ports.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
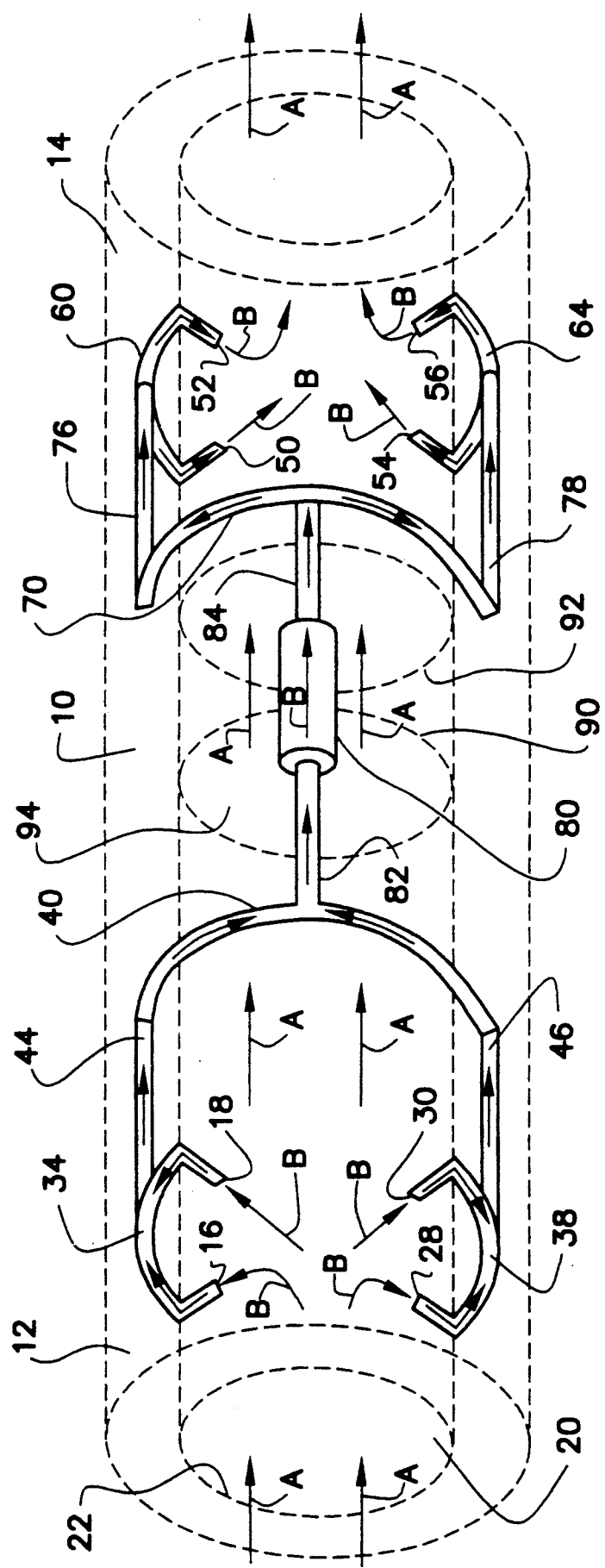
FIG. 1 shows a solid line representation of the conduits of the present invention in relation to a dashed line representation of a housing of a flow channel.

Throughout the Description of the preferred embodiment of the present invention, like components will be identified with like reference numerals. In FIG. 1, the conduits of the present invention are illustrated by solid lines and the conduit in which the present invention is disposed is illustrated by dashed lines. It should clearly be understood that the conduits illustrated by solid lines in FIG. 1 are actually open spaces formed within the walls of a conduit in a preferred embodiment of the present invention.

The conduit 10 has an upstream portion 12 and a downstream portion 14. A first pair of ports, 16 and 18, are formed in the wall of the conduit 10 and are connected in fluid communication with the flow channel 20 that extends through the conduit. In other words, the first pair of ports, 16 and 18, extend through the inner circumference 22 of the conduit. A second pair of ports, 28 and 30, are similarly arranged on a common circumference with the first pair of ports, 16 and 18.

A first means 34 is provided for connecting the first pair of ports together in fluid communication with each other and a second means 38 is provided for connecting the second pair of ports in fluid communication with each other. A third means 40 is provided for connecting a central part of the first means 34 and a central part of the second means 38 together in fluid communication with each other. To facilitate the formation of the fluid passages within the wall of the conduit 10, the third connecting means 40 is displaced axially from the first and second connecting means, 34 and 38, and passages 44 and 46 are used to make the connections described above.

In a preferred embodiment of the present invention, a similarly constructed arrangement of fluid passages is disposed downstream from the mass airflow sensor. For example, a third pair of ports, 50 and 52, and a fourth pair of ports, 54 and 56, are arranged on a common second circumference and extend through the inner circumference 22 of conduit 10. In addition, a fourth means 60 is provided for connecting the third pair of conduits together in fluid communication with each other and a fifth means 64 is provided for connecting the fourth pair of ports together in fluid communication with each other. A sixth connecting means 70 is provided for connecting the central parts of the third and fourth connecting means together. For similar reasons to those described above in conjunction with fluid passages 44 and 46, fluid passages 76 and 78 are provided to permit the fluid communication between the fourth, fifth and sixth connecting means to be accomplished while the sixth connecting means is displaced axially from the fourth and fifth connecting means as shown in FIG. 1. Between the third connecting means 40 and the sixth connecting means 70, a mass airflow sensor 80 is provided. The mass airflow sensor 80 is disposed within a seventh connecting means that comprises the channels identified by reference numerals 82 and 84 in FIG. 1. The mass airflow sensor 80 can be any type of mass airflow sensor that is capable of providing a signal which is representative of the flow through fluid channels 82 and 84. For example, the mass airflow sensors described in U.S. Pat. No. 4,856,328 or U.S. Pat. No.

4,829,818 are suitable for use in association with the present invention. Similarly, the mass airflow sensors described in U.S. Pat. No. 4,885,938 or U.S. Pat. No. 4,776,214 are also suitable for use in association with the present invention. It should be understood that the present invention is not limited for use with any particular type of mass airflow sensor but, instead, is related to the interconnection system between the mass airflow sensor 80 and the main fluid channel 20 shown in FIG. 1. The mass airflow sensors described above are explicitly incorporated by reference herein.

Also shown in FIG. 1, as represented by dashed lines, 90 and 92, is a region in which a honeycomb device is disposed. The purpose of this device 94 is to create a slight pressure differential between the first and second pairs of ports and the third and fourth pairs of ports and therefore induce a flow through the system of conduits illustrated in FIG. 1. Each of the honeycomb devices used in association with the present invention comprises a plurality of hexagonal tubular conduits arranged in a honeycomb configuration and disposed in the main flow channel to force the fluid to pass through one of the plurality of hexagonal conduits. Although the preferred embodiment of the present invention is described in terms of the use of these honeycomb devices, it should be understood that many other types of devices could satisfy this requirement. Any device which provides a small, but measurable, pressure drop between the upstream and downstream portions of the conduit without introducing disadvantageous flow characteristics can be used in association with the present invention to create the pressure drop between the upstream and downstream portions and thereby induce fluid flow through the present invention. This type of device could be an orifice plate, a laminar flow element or other types of devices that can be inserted into conduit 20. It should be understood that the pressure differential could also be provided by using a Venturi arrangement which incorporates two different diameters in the conduit 20.

With continued reference to FIG. 1, arrows A represent the main flow passing through channel 20. Arrows B represent the diverted flow of fluid that passes through the system of conduits and fluid channels provided by the present invention. Because of the pressure differential between the upstream portion 12 of the conduit 10 and the downstream portion 14 of the conduit 10, a flow is induced into the first and second pairs of ports. The first connecting means 34 channels the flow from the first pair of ports, 16 and 18, toward a central point where the fluid passage 44 is connected to the first connecting means 34. Therefore, the average flow from the first pair of ports passes through fluid passage 44 to one end of the third connecting means 40. Similarly, the second pair of ports, 28 and 30, provide fluid flow to the passage 46 which, in turn, is connected to the opposite end of the third connecting means 40. The arrows shown within the various connecting means of the present invention are not all labeled with reference letter B. However, it should be understood that all of the arrows shown within the mass airflow sensor 80 and its connected conduit system are representative of arrows B and are used to illustrate the flow of the diverted fluid.

The arrangement of fluid passages shown in FIG. 1 provides a flow of diverted fluid through the mass airflow sensor 80 which is an appropriate sampling of the average flow through channel 20. If temporary perturbations occur within channel 20 to the flow along its inner circumference 22, the use of a plurality of ports provides an average of those perturbations and maintains a consistent and predictable sampling of the flow to the flow sensor. When a system, such as that shown in FIG. 1, is provided with an upstream arrangement of interconnected conduits and a downstream system of interconnected conduits that are arranged as a mirror image of the upstream system, the overall flow sensor arrangement is suitable for use with flows in both directions through conduit 20. This type of arrangement can be particularly applicable for use in automotive systems incorporating an internal combustion engine, because temporary backflows can occur in which arrows A indicate the normal flow of fluid into an internal combustion engine and momentary cessations in that normal direction occur followed by momentary flows in the opposite direction due to the interaction of the airflow with the opening and closing of valves within the engine.

Figure 2:
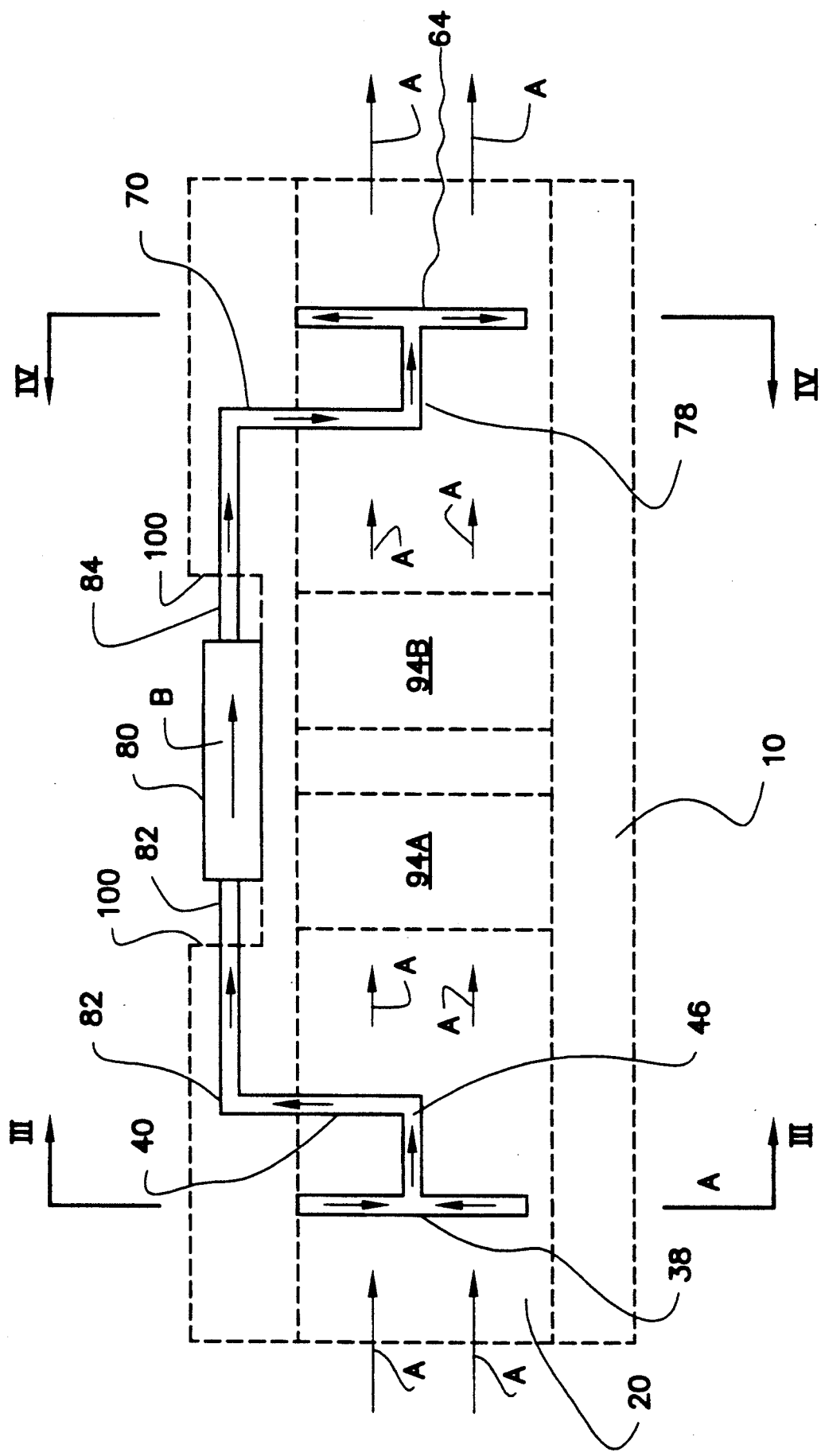
FIG. 2 shows a side sectional view of the illustration of FIG. 1.

FIG. 2 is a side view of a section of the device which is illustrated in the perspective view in FIG. 1. The illustration in FIG. 2 shows a depression 100 that is formed in the external surface of the conduit 10 and shaped to receive the mass airflow sensor 80 therein. This type of arrangement permits the mass airflow sensor 80 to be assembled to the conduit 10 to form a continuous fluid passage comprising all of the other fluid flow channels and connecting means described above. In addition, if the mass airflow sensor 80 must be repaired or replaced, the provision of the depression 100 facilitates this process by placing the sensor in a readily accessible position.

In conjunction with FIG. 1, the flame traps are indicated as a region between dashed lines 90 and 92. In FIG. 2, this region is illustrated more specifically as two individual regions, 94A and 94B, in which two flame traps are located. The flame traps perform an important function in association with the present invention. They provide a slight pressure drop between the upstream region and the downstream region of the conduit 20 and therefore provide a slightly higher pressure at the first and second pairs of ports than at the third and fourth pairs of ports. This pressure differential induces the flow of diverted fluid which is illustrated by arrows B within the connecting means of the present invention. In addition, the flame traps, 94A and 94B, ameliorate the effects of the momentary backflows caused by the operation of an internal combustion engine.

Figure 4:
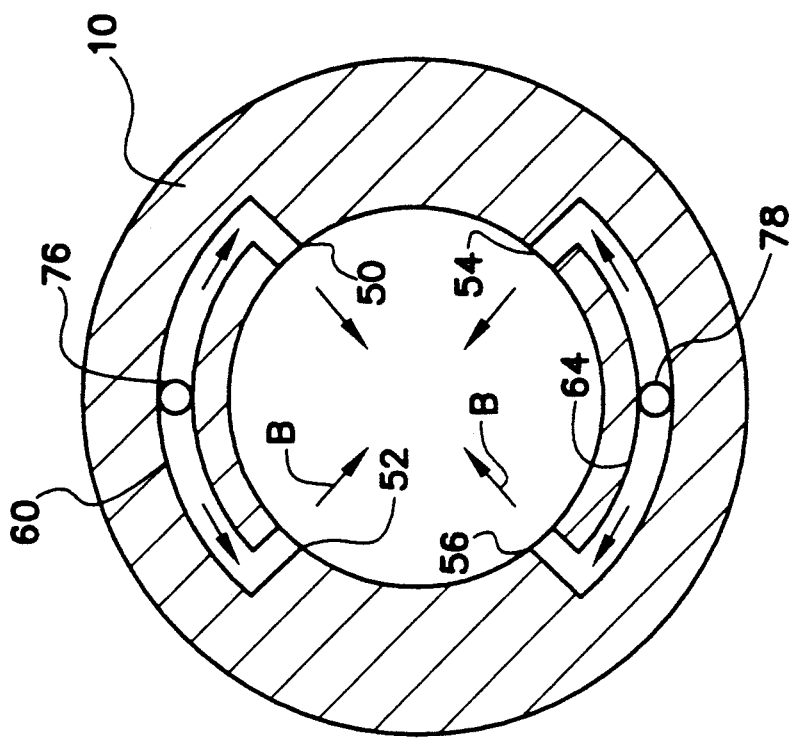
FIGS. 3 and 4 are sectional views upstream and downstream ports of the present invention shown in FIG. 2.
Figure 3:
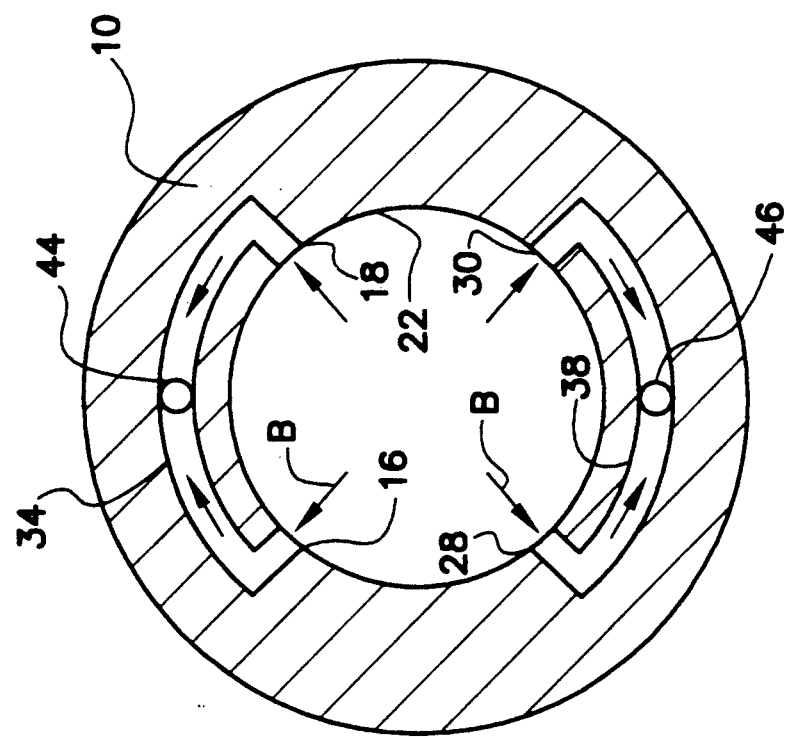

FIGS. 3 and 4 are sectional views of FIG. 2. In FIG. 3, the first and second pairs of ports can be seen intersecting the inner cylindrical surface 22 at generally equally spaced locations. The flow enters the first and second pairs of ports and flows toward fluid channels 44 and 46 which connect the average flow of the first and second connecting means, 34 and 38, in fluid communication with the third connecting means 40 (not shown in FIG. 3). The first and second pairs of ports, in a preferred embodiment of the present invention, are arranged symmetrically around the circumference 22 at 90 degree intervals as illustrated in FIG. 3. Although the present invention is illustrated as having four ports in the upstream portion of conduit 20, it should be understood that a different number of ports connected in fluid communication with conduit 20 can be used in association with the present invention. In addition, it should also be understood that the symmetrical arrangement shown in FIG. 3 and described above is not a necessity of the present invention. In addition, although the illustration in FIG. 1 is drawn with the various fluid passages represented by solid lines and the conduit 10 represented by dashed lines, wherein the open ends of ports 16, 18, 28 and 30 appear to protrude into conduit 20, it should be understood that the ends of these ports are coincident with the inner cylindrical surface 22 so as not to adversely affect the flow of fluid through conduit 20. This relationship is not clearly illustrated in FIG. 1 because of the way that the components are represented for purposes of clarity, but they are more clearly illustrated in the section views of FIGS. 3 and 4 which clearly show all of the upstream and downstream ports to have their open ends shaped to be coincident with the inner cylindrical surface 22 of the device.

FIG. 4 shows a section view through the third and fourth pairs of ports of the present invention. Fluid passes through passages 76 and 78 into the fourth and fifth connecting means, 60 and 78. From those connecting means, the diverted fluid flows through the third and fourth ports and returns to the main channel 20 of conduit 10. The arrangement of ports and conduits of the present invention provides a mass airflow sensing system with significantly decreased sensitivity to flow perturbations caused by the shape of the fluid path upstream from the sensing system. In addition, the present invention is less susceptible to errors in measurement caused by impulses of backflow.

Although the present invention has been described with significant specificity and illustrated to particularly depict a preferred embodiment of the present invention, it should be clearly understood that other alternative embodiments are within the scope of the claims.

The embodiments of the invention in which an exclusive property or right is claimed are defined as follows:

1. A flow sensor, comprising:
   a housing having a flow channel extending therethrough, said flow channel having an upstream portion and a downstream portion;
   first and second pairs of ports connected in fluid communication with said flow channel and arranged along a first circumference of said flow channel;
   first means, external to said flow channel, for connecting said first pair of ports together in fluid communication with each other;
   second means, external to said flow channel, for connecting said second pair of ports together in fluid communication with each other;
   third means for connecting said first and second connecting means together in fluid communication with each other;
   third and fourth pairs of ports connected in fluid communications with said flow channel and arranged along a second circumference of said flow channel, said second circumference being displaced from said first circumference in a direction toward said downstream portion;
   fourth means, external to said flow channel, for connecting said third pair of ports together in fluid communication with each other;
   fifth means, external to said flow channel, for connecting said fourth pair of ports together in fluid communication with each other;
   sixth means for connecting said fourth and fifth connecting means together in fluid communication with each other;
   seventh means for connecting said third and sixth connecting means together in fluid communication with each other; and
   a flow measuring device disposed within said seventh connecting means.

2. The flow sensor of claim 1, further comprising:
   means for causing the pressure at said second circumference to be less than the pressure at said first circumference.

3. The flow sensor of claim 2, wherein:
   said causing means comprises a honeycomb structure disposed between said first and second circumferences.

4. The flow sensor of claim 1, wherein:
   said flow measuring device is a silicon based sensor.

5. The flow sensor of claim 1, wherein:
   said flow measuring device is a mass airflow sensor.

6. The flow sensor of claim 1, wherein:
   said first, second, third, fourth, fifth and sixth connecting means are formed within said housing.

7. A flow sensor, comprising:
   a housing having a flow channel extending therethrough, said flow channel having an upstream portion and a downstream portion;
   a first conduit connected in fluid communication with a first pair of ports of said flow channel;
   a second conduit connected in fluid communication with a second pair of ports of said flow channel, said first and second conduits being arranged on a first circumference of said flow channel;
   a third conduit connected in fluid communication with said first and second conduits, said third conduit being disposed on a second circumference of said flow channel, said second circumference being displaced from said first circumference in a direction toward said downstream portion;
   a fourth conduit connected in fluid communication with a third pair of ports of said flow channel;
   a fifth conduit connected in fluid communication with a fourth pair of ports of said flow channel, said fourth and fifth conduits being arranged on a third circumference of said flow channel;
   a sixth conduit connected in fluid communication with said fourth and fifth conduits, said sixth conduit being disposed on a fourth circumference of said flow channel, said fourth circumference being displaced from said third circumference in a direction toward said upstream portion;
   a seventh conduit connected in fluid communication with said third and sixth conduits, said sixth conduit being displaced from said third conduit in a direction toward said downstream portion; and
   a flow measuring device disposed within said seventh conduit.

8. The flow sensor of claim 7, further comprising:
   means for causing the pressure proximate said third and fourth pairs of ports to be less than the pressure proximate said first and second pairs of ports.

9. The flow sensor of claim 8, wherein:
   said causing means comprises a flow restrictor disposed within said flow channel between said first and third circumferences.

10. The flow sensor of claim 8, wherein:
    said causing means comprises a reduction in diametric dimension from said first circumference to said third circumference.

11. The flow sensor of claim 7, wherein:
    said flow measuring device is a mass airflow sensor.

12. The flow sensor of claim 7, wherein:
    said first, second, third, fourth, fifth and sixth conduits are formed in said housing.

13. The flow sensor of claim 12, wherein:
    said seventh conduit is formed in said housing.

* * * * *